United States Patent
Kasahara et al.

(10) Patent No.: US 8,956,762 B2
(45) Date of Patent: Feb. 17, 2015

(54) LITHIUM ION SECONDARY BATTERY AND METHOD FOR MANUFACTURING THE SAME

(75) Inventors: Ryuichi Kasahara, Tokyo (JP); Jiro Iriyama, Tokyo (JP); Tetsuya Kajita, Tokyo (JP); Hiroo Takahashi, Tokyo (JP); Tatsuji Numata, Tokyo (JP); Daisuke Kawasaki, Tokyo (JP)

(73) Assignees: NEC Corporation, Tokyo (JP); NEC Energy Devices, Ltd., Kanagawa (JP)

( * ) Notice: Subject to any disclaimer, the term of this patent is extended or adjusted under 35 U.S.C. 154(b) by 117 days.

(21) Appl. No.: 13/805,565

(22) PCT Filed: Jul. 29, 2011

(86) PCT No.: PCT/JP2011/067449
§ 371 (c)(1),
(2), (4) Date: Dec. 19, 2012

(87) PCT Pub. No.: WO2012/015033
PCT Pub. Date: Feb. 2, 2012

(65) Prior Publication Data
US 2013/0108914 A1 May 2, 2013

(30) Foreign Application Priority Data

Jul. 29, 2010 (JP) ................. 2010-170760
Mar. 4, 2011 (JP) ................. 2011-047784

(51) Int. Cl.
*H01M 4/134* (2010.01)
*H01M 4/38* (2006.01)
(Continued)

(52) U.S. Cl.
CPC ............ *H01M 4/386* (2013.01); *H01M 4/0421* (2013.01); *H01M 4/134* (2013.01);
(Continued)

(58) Field of Classification Search
USPC ....................... 429/163, 231.8, 231.9, 231.95
See application file for complete search history.

(56) References Cited

U.S. PATENT DOCUMENTS

2003/0096165 A1 * 5/2003 Nakahara et al. ............. 429/213
2009/0239151 A1 9/2009 Nakanishi et al.
(Continued)

FOREIGN PATENT DOCUMENTS

EP 2045867 A1 4/2009
JP 5-144471 A 6/1993
(Continued)

OTHER PUBLICATIONS

Hong Li, et al., "A High Capacity Nano-Si Composite Anode Material for Lithium Rechargeable Batteries", Electrochemical and Solid-State Letters, Nov. 1999, pp. 547-549, vol. 2, No. 11.
(Continued)

*Primary Examiner* — Mark F Huff
*Assistant Examiner* — Olatunji Godo
(74) *Attorney, Agent, or Firm* — Sughrue Mion, PLLC

(57) ABSTRACT

In a lithium ion secondary battery including a positive electrode, a separator, a negative electrode, and a package body, the negative electrode includes simple substance silicon as a negative electrode active material, and a negative electrode binder, and is doped with lithium, and the following formulas (1) and (2) are satisfied:

$$1.2 \leq M_a/M_c \leq 1.9 \quad (1)$$

$$1.0 < M_a/(M_c + M_{Li}) < 1.6 \quad (2)$$

wherein an amount of lithium inserted into the negative electrode until the negative electrode reaches a potential of 0.02 V with respect to metal lithium is $M_a$ (a number of atoms), an amount of lithium released from the positive electrode until the positive electrode reaches a potential of 4.3 V with respect to metal lithium is $M_c$ (a number of atoms), and an amount of lithium with which the negative electrode is doped is $M_{Li}$ (a number of atoms).

19 Claims, 2 Drawing Sheets

(51) Int. Cl.
*H01M 4/04* (2006.01)
*H01M 4/1395* (2010.01)
*H01M 4/62* (2006.01)
*H01M 10/0525* (2010.01)
*H01M 10/0585* (2010.01)

(52) U.S. Cl.
CPC ............ *H01M4/1395* (2013.01); *H01M 4/622* (2013.01); *H01M 10/0525* (2013.01); *H01M 10/0585* (2013.01); *Y02T 10/7011* (2013.01); *Y02E 60/122* (2013.01)
USPC ................ 429/231.95; 429/231.8; 429/231.9; 429/163

(56) References Cited

U.S. PATENT DOCUMENTS

| | | |
|---|---|---|
| 2009/0246631 A1 | 10/2009 | Hojo et al. |
| 2009/0253033 A1 | 10/2009 | Hirose et al. |
| 2009/0269677 A1 | 10/2009 | Hirose et al. |
| 2009/0325072 A1* | 12/2009 | Maeda et al. ................ 429/220 |

FOREIGN PATENT DOCUMENTS

| | | |
|---|---|---|
| JP | 7-192766 A | 7/1995 |
| JP | 2002-260637 A | 9/2002 |
| JP | 2003-109590 A | 4/2003 |
| JP | 2005-063805 A | 3/2005 |
| JP | 2006-012576 A | 1/2006 |
| JP | 2008-034353 A | 2/2008 |
| JP | 2009-076372 A | 4/2009 |
| JP | 2009-224168 A | 10/2009 |
| JP | 2009-252580 A | 10/2009 |
| JP | 2009-266473 A | 11/2009 |
| JP | 2010-160983 A | 7/2010 |
| JP | 2011-054324 A | 3/2011 |
| JP | 2012-124057 A | 6/2012 |

OTHER PUBLICATIONS

Communication dated Jul. 15, 2014, issued by the European Patent Office, in counterpart Application No. 11812622.6.

* cited by examiner

LITHIUM ION SECONDARY BATTERY AND METHOD FOR MANUFACTURING THE SAME

CROSS REFERENCE TO RELATED APPLICATIONS

This application is a National Stage of International Application No. PCT/JP2011/067449 filed Jul. 29, 2011, claiming priority based on Japanese Patent Application Nos. 2010-170760, filed Jul. 29, 2010 and 2011-047784 filed Mar. 4, 2011, the contents of all of which are incorporated herein by reference in their entirety.

TECHNICAL FIELD

The present invention relates to a lithium ion secondary battery and a method for manufacturing the same.

BACKGROUND ART

With the spread of mobile equipment, such as cellular phones and notebook computers, the role of secondary batteries, which are the power sources of the mobile equipment, is regarded as important. These secondary batteries are required to be of small size, light weight, and high capacity, and be less likely to cause the deterioration of charge and discharge capacity even if charge and discharge are repeated. As secondary batteries that satisfy such characteristics, many lithium ion secondary batteries are currently used.

Carbon, such as graphite and hard carbon, is mainly used for the negative electrodes of lithium ion secondary batteries. With carbon, a charge and discharge cycle can be repeated well, but a capacity around the theoretical capacity has already been achieved, and therefore, a significant improvement in capacity cannot be expected in the future. On the other hand, the demand for an improvement in the capacity of lithium ion secondary batteries is strong, and therefore, studies of negative electrode materials having higher capacity, that is, higher energy density, than carbon are performed.

Studies of metal lithium are also performed for the negative electrodes of lithium ion secondary batteries from the viewpoint of high energy density and light weight. But, a problem of metal lithium is that with the progress of charge and discharge cycles, dendrites are deposited on the metal lithium surface during charge, and the crystals penetrate the separator, causing an internal short circuit, and thus short life.

As a material that increases energy density, the use of a Li-occluding substance that forms an alloy with lithium, represented by the composition formula $Li_xA$ (A comprises an element such as aluminum), as a negative electrode active material, is studied. This negative electrode active material has a large amount of occluded and released lithium ions per unit volume and high capacity.

Non Patent Literature 1 describes the use of silicon as a negative electrode active material. It is alleged that by using such a negative electrode material, a negative electrode with high capacity is obtained.

Patent Literature 1 describes a nonaqueous electrolyte secondary battery in which metal lithium foil previously affixed to a positive electrode is electrochemically diffused in the carbon material of a negative electrode, and lithium capable of discharging is retained in the carbon material of the negative electrode. It is disclosed that in this secondary battery, the capacity of the affixed metal lithium foil is 4 to 40% with respect to the saturation reversible capacity of the carbon material used for the negative electrode.

Patent Literature 2 describes a nonaqueous electrolyte secondary battery characterized in that lithium is previously provided to a negative electrode portion not opposed to a positive electrode. As a method for providing lithium to the negative electrode portion, affixing lithium or electrochemically doping with lithium is described. It is disclosed that in this secondary battery, the amount of metal lithium allowed to previously exist in the negative electrode portion not opposed to the positive electrode is 0.10 to 3.00 mg per 1 $cm^2$ of the negative electrode.

Patent Literature 3 describes a nonaqueous secondary battery characterized in that the negative electrode includes a material in which $SiO_x(0.3 \leq x \leq 1.6)$ is predoped with lithium. It is disclosed that when the atomic ratio Lp of lithium released from the positive electrode and occluded in the negative electrode to the negative electrode Si, and the atomic ratio Ln of lithium with which the negative electrode is predoped to the negative electrode Si satisfy particular conditions, the energy density and the average voltage are improved, and good rate characteristics are obtained.

CITATION LIST

Patent Literature

Patent Literature 1: JP5-144471A
Patent Literature 2: JP7-192766A
Patent Literature 3: JP2009-076372A

Non Patent Literature

Non Patent Literature 1: Li and four others, "A High Capacity Nano-Si Composite Anode Material for Lithium Rechargeable Batteries, Electrochemical and Solid-State Letters, Vol. 2, No. 11, p 547-549 (1999)

SUMMARY OF INVENTION

Technical Problem

As described in Non Patent Literature 1, a battery using silicon as a negative electrode active material has a large amount of occluded and released lithium ions per unit volume and high capacity. But, problems are that pulverization proceeds due to the fact that the electrode active material itself expands and shrinks when lithium ions are occluded and released, and the irreversible capacity in first charge and discharge is large, and the charge and discharge cycle life is short.

In addition, in the method described in Patent Literature 1, the total of the capacity of the positive electrode and the capacity of the affixed lithium may be more than the capacity of the negative electrode, which is not sufficient as a condition. In this case, a problem is that lithium is deposited on the negative electrode surface during charge, thereby causing a rapid decrease in capacity.

In the method described in Patent Literature 2, the amount of metal lithium foil previously affixed to the negative electrode is only defined. Therefore, a problem is that for the same reason as above, repeating charge and discharge causes a rapid decrease in capacity.

Also in the method described in Patent Literature 3, the total of the capacity of the positive electrode and the capacity of the affixed lithium may be more than the capacity of the negative electrode as described above, depending on the positive electrode material and the negative electrode material used. In this case, a problem is that repeating charge and discharge causes a rapid decrease in capacity.

It is an object of the present invention to provide a lithium ion secondary battery with high energy density and good cycle characteristics.

Solution to Problem

An aspect of the present invention provides a lithium ion secondary battery including a positive electrode, a separator, a negative electrode, and a package body, wherein the negative electrode includes simple substance silicon as a negative electrode active material, and a negative electrode binder, and is doped with lithium, and the following formulas (1) and (2) are satisfied:

$$1.2 \leq M_a/M_c \leq 1.9 \quad (1)$$

$$1.0 < M_a/(M_c+M_{Li}) < 1.6 \quad (2)$$

wherein an amount of lithium inserted into the negative electrode until the negative electrode reaches a potential of 0.02 V with respect to metal lithium is $M_a$ (a number of atoms), an amount of lithium released from the positive electrode until the positive electrode reaches a potential of 4.3 V with respect to metal lithium is $M_c$ (a number of atoms), and an amount of lithium with which the negative electrode is doped is $M_{Li}$ (a number of atoms).

Another aspect of the present invention provides a lithium ion secondary battery including a positive electrode, a separator, a negative electrode, and a package body, wherein the negative electrode includes simple substance silicon as a negative electrode active material, and a negative electrode binder, and is doped with lithium, and the following formulas (3) and (4) are satisfied:

$$1.2 \leq C_a/C_c \leq 1.9 \quad (3)$$

$$1.0 < C_a/(C_c+C_{Li}) < 1.6 \quad (4)$$

wherein a first charge capacity of the negative electrode when a potential of 0.02 V is reached with respect to metal lithium is $C_a$ (Ah), a first charge capacity of the positive electrode when a potential of 4.3 V is reached with respect to metal lithium is $C_c$ (Ah), and a capacity of lithium with which the negative electrode is doped is $C_{Li}$ (Ah).

Another aspect of the present invention provides a method for manufacturing one of the lithium ion secondary batteries, wherein a weight of an active material of the positive electrode, a weight of the active material of the negative electrode, and a weight of lithium with which the negative electrode is doped are set so as to satisfy the formulas (1) and (2) or formulas (3) and (4).

Advantageous Effect of Invention

An exemplary embodiment of the present invention can provide a lithium ion secondary battery with high energy density and good cycle characteristics.

DESCRIPTION OF EMBODIMENTS

Figure 1:
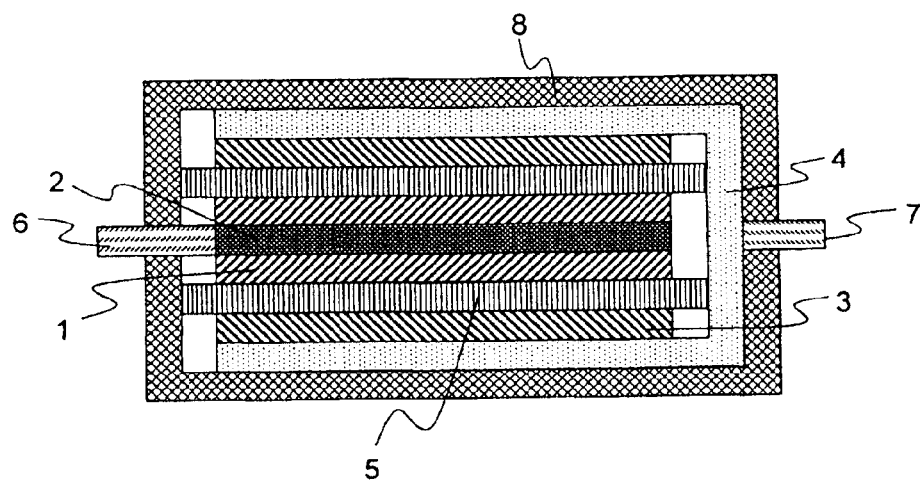
FIG. 1 is a schematic cross-sectional view showing a lithium ion secondary battery in accordance with an exemplary embodiment.

An exemplary embodiment of the present invention will be described below referring to the drawings.

A lithium ion secondary battery in accordance with this exemplary embodiment includes a negative electrode composed of a negative electrode current collector 2, such as copper foil, and a negative electrode active material layer 1 formed on a surface of the negative electrode current collector 2, and a positive electrode composed of a positive electrode current collector 4, such as aluminum, and a positive electrode active material layer 3 formed on a surface of the positive electrode current collector 4, as shown in FIG. 1. The negative electrode active material layer 1 and the positive electrode active material layer 3 are disposed opposed to each other via a separator 5. A portion where the separator 5 and the negative electrode active material layer 1 are disposed opposed to each other, and a portion where the separator 5 and the positive electrode active material layer 3 are disposed opposed to each other are impregnated with an electrolytic solution. A negative electrode terminal 6 and a positive electrode terminal 7 are connected to the negative electrode current collector 2 and the positive electrode current collectors 4, respectively, for the removal of the electrodes.

In FIG. 1, the negative electrode active material layers are provided on both surfaces of the negative electrode current collector 2, and the positive electrode active material layers are disposed on respective negative electrode active material layers via the separators, and the two positive electrode current collectors are connected to each other at their ends by welding or the like. Further, a laminated body composed of a negative electrode active material layer on a negative electrode current collector, a positive electrode active material layer on a positive electrode current collector, and a separator between the positive electrode active material layer and the negative electrode active material layer may be laminated. The positive electrode current collectors can be connected to each other at their ends by welding or the like, and the negative electrode current collectors can be connected to each other at their ends by welding or the like.

The element formed in this manner is sealed in a package body 8.

Figure 2:
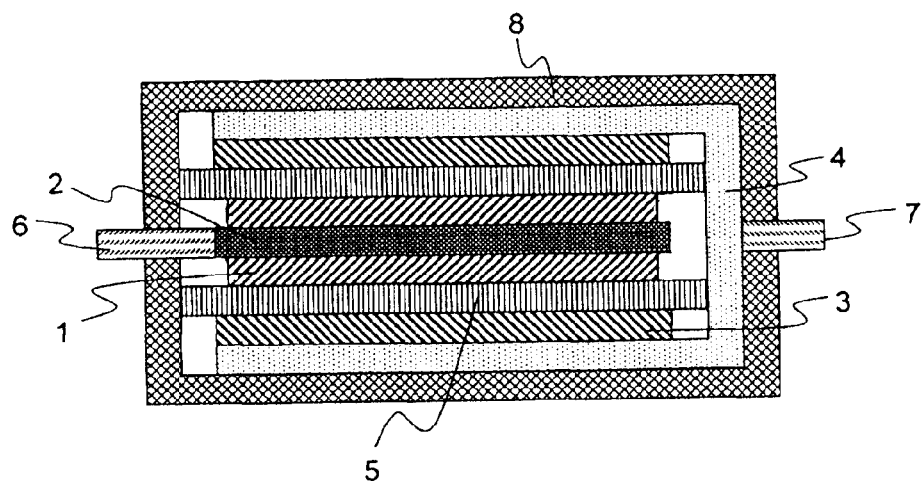
FIG. 2 is a schematic cross-sectional view showing a lithium ion secondary battery in accordance with another exemplary embodiment.

Here, the area $S_A$ of the surface $F_A$ of the negative electrode active material layer opposed to the positive electrode active material layer is preferably smaller than the area $S_C$ of the surface $F_C$ of the positive electrode active material layer opposed to the negative electrode active material layer, as shown in FIG. 2. In addition, the negative electrode active material layer is preferably disposed so that the entire surface $F_A$ is opposed to the surface $F_C$ of the positive electrode active material. If the area $S_A$ of the negative electrode active material layer is too larger than the area $S_C$ of the positive electrode active material layer, the difference in the degree of the volume change of the negative electrode between a portion opposed to the positive electrode and a portion not opposed to the positive electrode increases, and the deformation of the negative electrode is likely to occur. As a result, wrinkles, cuts, or the like occur in the negative electrode, and the battery characteristics may decrease.

From such a viewpoint, $S_A/S_C$ is preferably smaller than 1, preferably 98/100 or less, and more preferably 96/100 or less. However, if $S_A/S_C$ is too small, lithium released from the positive electrode is not sufficiently occluded in the negative electrode, and lithium is deposited on the outer peripheral portion of the negative electrode, causing a short (particularly when dendrites are formed). Therefore, $S_A/S_C$ is preferably 90/100 or more, more preferably 92/100 or more.

When the negative electrode active material layer is disposed so that the entire surface $F_A$ thereof is opposed to the surface $F_C$ of the positive electrode active material, the volume change of the negative electrode active material layer in charge and discharge can occur uniformly in the entire negative electrode. On the contrary, if the negative electrode active material layer is not disposed so that the entire surface $F_A$ thereof is opposed to the surface $F_C$ of the positive electrode active material, no volume change occurs in charge and discharge in the outer peripheral side portion of the negative electrode active material layer not opposed to the positive electrode active material layer, whereas volume change occurs in charge and discharge in the central portion of the negative electrode active material layer opposed to the positive electrode active material layer. As a result, the degree of volume change is different between the outer peripheral side portion and the central portion. Therefore, deformation, such as wrinkles or warpage, occurs in the negative electrode, which may increase resistance, and in turn decrease capacity.

In the secondary battery in accordance with this exemplary embodiment, the following formulas (1) and (2) are satisfied:

$$1.2 \leq M_a/M_c \leq 1.9 \quad (1)$$

$$1.0 < M_a/(M_c+M_{Li}) < 1.6 \quad (2)$$

wherein the amount of lithium inserted into the negative electrode until the negative electrode reaches a potential of 0.02 V with respect to metal lithium is $M_a$ (the number of atoms), the amount of lithium released from the positive electrode until the positive electrode reaches a potential of 4.3 V with respect to metal lithium is $M_c$ (the number of atoms), and the amount of lithium with which the negative electrode is doped is $M_{Li}$ (the number of atoms).

When the amount of lithium inserted into the negative electrode, $M_a$, the amount of lithium released from the positive electrode, $M_c$, and the amount of lithium with which the negative electrode is doped, $M_{Li}$, satisfy formulas (1) and (2) in this manner, the energy density and charge and discharge cycle characteristics of the lithium ion secondary battery can be improved.

The secondary battery that satisfies the above formulas (1) and (2) preferably further satisfies the following formulas (5), (6), and (7):

$$M_a = M_{a1} - M_{a2} \quad (5)$$

$$M_c = M_{c2} - M_{c1} \quad (6)$$

$$M_{Li} = M_{a2} \quad (7)$$

wherein the amount of lithium in the negative electrode and the amount of lithium in the positive electrode in a charged state are $M_{a1}$ and $M_{c1}$ respectively, and the amount of lithium in the negative electrode and the amount of lithium in the positive electrode in a discharged state are $M_{a2}$ and $M_{c2}$, respectively.

Here, the charged state and the discharged state mean states in which rated charge and discharge are performed. A charged state in rated charge and discharge can be defined as a state in which charge is performed to 4.2 V at constant current (1 C), and then, charge is performed at a constant voltage of 4.2 V for a total of 2.5 hours (a total time of constant current charge and constant voltage charge), and a discharged state can be defined as a state in which discharge is performed to 2.7 V at constant current (1 C).

The conditions defined by the above formulas (1) and (2) and the conditions defined by the above formulas (5), (6), and (7) are desirably satisfied when the battery is in a state in which a rated capacity is obtained. Particularly, it is preferred that the battery is in a state in which the quantity of electricity exhibited when charge is performed to 4.2 V at constant current (1 C), and then, charge is performed at a constant voltage of 4.2 V for a total of 2.5 hours (a total time of constant current charge and constant voltage charge), and discharge is performed to 2.7 V at constant current (1 C) is equal to or more than the rated capacity.

The amount of lithium in the positive electrode and the negative electrode in the charged state and the discharged state can be obtained, for example, by performing quantitative analysis by ICP-AES (inductively coupled plasma-atomic emission spectroscopy). Quantitative analysis can be performed, for example, by ICP-MS (inductively coupled plasma-mass spectrometry) or ion chromatography analysis, other than ICP atomic emission spectroscopy.

The amount of lithium in the negative electrode, $M_a$, corresponds to the difference between the amount of lithium in the negative electrode in the charged state, $M_{a1}$, and the amount of lithium in the negative electrode in the discharged state, $M_{a2}$. The amount of lithium in the positive electrode, $M_c$, corresponds to the difference between the amount of lithium in the positive electrode in the discharged state, $M_{c2}$, and the amount of lithium in the positive electrode in the charged state, $M_{c1}$.

The amount of lithium with which the negative electrode is doped, $M_{Li}$, is equal to the amount of lithium in the negative electrode in the discharged state, $M_{a2}$. In other words, this amount of lithium corresponds to a capacity not contributing to charge and discharge reactions, and the amount of lithium with which the negative electrode is doped can also be estimated after the first charge and discharge.

The relationship between the amount of lithium inserted into the negative electrode, the amount of lithium released from the positive electrode, and the amount of lithium with which the negative electrode is doped described above corresponds to the relationship between the first charge and discharge capacity of the negative electrode, the first charge and discharge capacity of the positive electrode, and the capacity of lithium with which the negative electrode is doped.

In the secondary battery in accordance with this exemplary embodiment, the following formulas (3) and (4) are satisfied:

$$1.2 \leq C_a/C_c \leq 1.9 \quad (3)$$

$$1.0 < C_a/(C_c+C_{Li}) < 1.6 \quad (4)$$

wherein the first charge capacity of the negative electrode when a potential of 0.02 V is reached with respect to metal lithium is $C_a$ (Ah), the first charge capacity of the positive electrode when a potential of 4.3 V is reached with respect to metal lithium is $C_c$ (Ah), and the capacity of lithium with which the negative electrode is doped is $C_{Li}$ (Ah).

When the first charge capacity of the negative electrode, $C_a$, the first charge capacity of the positive electrode, $C_c$, and the capacity of lithium with which the negative electrode is doped, $C_{Li}$, satisfy formulas (3) and (4) in this manner, the energy density and charge and discharge cycle characteristics of the lithium ion secondary battery can be improved.

Compared with doping the positive electrode with lithium, doping the negative electrode with lithium is less likely to destroy the structure of the active material, and also produces lithium silicon oxide leading to a reduction in irreversible capacity, and therefore, variations in characteristics can be suppressed.

In the secondary battery in accordance with this exemplary embodiment, the negative electrode is doped with lithium. Examples of a method for doping the negative electrode with lithium include a method of bringing the negative electrode and lithium into conduction in the presence of an electrolytic solution, and a method of vapor-depositing lithium on the negative electrode active material layers. In addition, it is also possible to dope a powdery negative electrode active material with lithium and form an electrode using this doped active material.

When $M_a/M_c$ or $C_a/C_c$ is smaller than 1.2, the increasing effect of lithium predoping on the energy density of the lithium ion secondary battery is small. When $M_a/M_c$ or $C_a/C_c$ is larger than 1.9, the increasing effect of predoping on the energy density of the lithium ion secondary battery is small, and further, the amount of lithium with which the negative electrode is doped is excessive, thereby causing the deterioration of the negative electrode, which in turn leads to a decrease in charge and discharge cycle characteristics. From such a viewpoint, $M_a/M_c$ and $C_a/C_c$ are preferably 1.2 or more, more preferably 1.3 or more, and further preferably 1.4 or more, and on the other hand are preferably 1.9 or less. $M_a/M_c$ and $C_a/C_c$ can be controlled by the weight of the active material of the positive electrode and the active material of the negative electrode.

On the other hand, when $M_a/(M_c+M_{Li})$ or $C_a/(C_c+C_{Li})$ is 1.0 or less, excess lithium is likely deposited on the negative electrode, and the charge and discharge cycle characteristics tend to decrease largely. When $M_a/(M_c+M_{Li})$ or $C_a/(C_c+C_{Li})$ is 1.6 or more, not only the increasing effect of lithium predoping on the energy density of the lithium ion secondary battery is small, but also negative electrode deterioration during discharge is likely to occur, which also leads to a decrease in charge and discharge cycle characteristics. From such a viewpoint, $M_a/(M_c+M_{Li})$ or $C_a/(C_c+C_{Li})$ is preferably larger than 1.0, and on the other hand is preferably smaller than 1.6, more preferably smaller than 1.5, and further preferably smaller than 1.4. Note that the capacity of lithium $C_{Li}$ can be controlled by the weight of lithium with which the negative electrode is doped.

From the viewpoint of obtaining sufficient cycle characteristics and obtaining high first discharge capacity, M1/M2 is larger than 1, preferably 1.05 or more, and more preferably 1.1 or more, and on the other hand is smaller than 1.9, more preferably 1.8 or less, and further preferably 1.7 or less, wherein $M_a/M_c$ is represented as M1, and $M_a/(M_c+M_{Li})$ is represented as M2.

Similarly, from the viewpoint of obtaining sufficient cycle characteristics and obtaining high first discharge capacity, C1/C2 is larger than 1, preferably 1.05 or more, and more preferably 1.1 or more, and on the other hand is preferably smaller than 1.9, more preferably 1.8 or less, and further preferably 1.7 or less, wherein $C_a/C_c$ is represented as C1, and $C_a/(C_c+C_{Li})$ is represented as C2.

The negative electrode active material layer of the secondary battery in accordance with this exemplary embodiment contains simple substance silicon as a negative electrode active material. The negative electrode active material may be only simple substance silicon, but preferably contains simple substance silicon and a silicon compound. Examples of the silicon compound include silicon oxide and transition metal-silicon compounds, such as nickel silicide and cobalt silicide. Silicon compounds are effective in relieving the expansion and shrinkage of the negative electrode active material itself with respect to repeated charge and discharge, and further are effective in ensuring conduction in simple substance silicon, the negative electrode active material, depending on the type of the silicon compounds.

Here, as the weight proportion of simple substance silicon in the negative electrode active material layer increases, the capacity of the lithium ion secondary battery increases, but the deterioration due to volume change with respect to repeated charge and discharge, and in turn the decrease in capacity increase. Therefore, the weight proportion of simple substance silicon in the negative electrode active material is preferably 5% or more, more preferably 10% or more, and further preferably 20% or more, and is preferably less than 50%, more preferably less than 45%.

The weight proportion of the silicon compound in the negative electrode active material is preferably 35% or more, more preferably 45% or more, and is preferably less than 90%, more preferably less than 80%.

The ratio M2/M1 of the weight of the silicon compound M2 to the weight of simple substance silicon M1 is preferably 0.8 or more, more preferably 1 or more, and is preferably less than 10, more preferably less than 8, and further preferably less than 4.

In addition, it is more preferred to mix or combine carbon, such as graphite, with simple substance silicon or a mixture of simple substance silicon and a silicon compound in the negative electrode active material layer. Like silicon compounds, carbon is effective in relieving the expansion and shrinkage of the negative electrode active material itself with respect to repeated charge and discharge, and ensuring conduction in simple substance silicon, the negative electrode active material. When both carbon and a silicon compound coexist, better cycle characteristics are obtained.

The weight proportion of carbon in the negative electrode active material is preferably 1% or more, more preferably 2% or more, and is preferably less than 30%, more preferably less than 10%.

The weight proportion of carbon to simple substance silicon is preferably 2% or more, more preferably 5% or more, and is preferably less than 50%, more preferably less than 20%.

Note that if small particle diameter particles are included in the negative electrode active material layer, the cycle characteristics tend to decrease. If the particle diameter is too large, the electrical characteristics tend to decrease. Therefore, the average particle diameter $D_{50}$ of particles included in the negative electrode active material layer is preferably adjusted to 0.1 μm or more and 20 μm or less, more preferably 0.5 μm or more and 10 μm or less.

Examples of a method for making a negative electrode active material containing simple substance silicon and a silicon compound include a method of mixing simple substance silicon and silicon oxide, and sintering the mixture at high temperature under reduced pressure, in the case of using silicon oxide as the silicon compound, and a method of mixing and melting simple substance silicon and a transition metal, and a method of coating the surface of simple substance silicon with a transition metal by vapor deposition or the like, in the case of using a transition metal-silicon compound as the silicon compound.

The methods for making a negative electrode active material described above can also be combined with methods for combining carbon on a negative electrode active material surface usually performed. For example, a carbon coating layer can be formed around a core including silicon and silicon oxide by a method of introducing a mixed and sintered material of simple substance silicon and silicon oxide into an organic compound gas atmosphere under a high temperature non-oxygen atmosphere, or by a method of mixing a mixed and sintered material of silicon and silicon oxide with a carbon precursor resin under a high temperature non-oxygen atmosphere. Thus, volume expansion in charge and discharge is suppressed, and a further improving effect on cycle characteristics is obtained. However, the electrode density is decreased by carbon coating, and the merit of battery capacity improvement, which is a feature of a silicon active material, decreases. Therefore, it is desired to set the amount of carbon coating considering the desired battery capacity and cycle characteristics.

The negative electrode active material layer may contain a conductive agent, such as carbon black or acetylene black, as required, in order to increase conductivity. The content of the conductive agent is preferably 5 parts by weight or less with respect to 100 parts by weight of the negative electrode active material.

The density of the negative electrode active material layer (electrode density) is preferably in the range of 1.0 g/cm³ or more and 2.0 g/cm³ or less. When the electrode density is too low, the charge and discharge capacity tends to decrease. When the electrode density is too high, it is difficult to impregnate the negative electrode active material layer with the electrolytic solution, and also, the charge and discharge capacity tends to decrease.

The negative electrode active material layer can be formed, for example, by dispersing and kneading negative electrode active material particles produced by the above method and a negative electrode binder in a solvent, applying the obtained slurry onto a negative electrode current collector, and drying the slurry in a high temperature atmosphere.

Examples of the negative electrode binder include polyimides, polyamides, polyamideimides, polyacrylic acid resins, and polymethacrylic acid resins. Thermosetting binders that undergo a dehydration condensation reaction by heating, such as polyimides, polyamides, and polyamideimides, are preferably used. The content of the negative electrode binder is preferably 5 to 20 parts by weight with respect to 100 parts by weight of the negative electrode active material.

As the solvent, N-methyl-2-pyrrolidone (NMP) and the like are preferred.

As the negative electrode current collector, copper, nickel, silver, and alloys thereof are preferred because of electrochemical stability. Examples of the shape of the negative electrode current collector include foil, a flat plate shape, and a mesh shape.

It is also possible to increase electrode density by pressing the negative electrode active material layer at room temperature or high temperature, as required.

In the secondary battery in accordance with the exemplary embodiment of the present invention, as the positive electrode active material included in the positive electrode active material layer, for example, lithium manganate; lithium cobaltate; lithium nickelate; mixtures of two or more of these lithium compounds; compounds in which part or all of the manganese, cobalt, or nickel moiety of the above lithium compounds is substituted by another metal element, such as aluminum, magnesium, titanium, or zinc; iron lithium phosphate, and the like can be used.

In addition, lithium manganate; nickel-substituted lithium manganate in which part of the manganese moiety of lithium manganate is substituted by at least nickel; lithium nickelate; cobalt-substituted lithium nickelate in which part of the nickel moiety of lithium nickelate is substituted by at least cobalt; and active materials in which the manganese or nickel moiety of these lithium compounds is substituted by another metal element (for example, at least one of aluminum, magnesium, titanium, and zinc) can be used. For example, an active material represented by the following composition formula can be used.

$$Li_a Ni_b Co_c Al_d O_2$$

$(0.80 \leq a \leq 1.05, 0.50 \leq b \leq 0.95, 0.10 \leq c \leq 0.50,$ and $0.01 \leq d \leq 0.15)$.

The positive electrode active material layer can be formed by dispersing and kneading a positive electrode active material and a positive electrode binder in a solvent, applying the obtained slurry onto a positive electrode current collector, and drying the slurry in a high temperature atmosphere. Examples of a substance mainly used as the positive electrode binder include polyvinylidene fluoride and polytetrafluoroethylene. As the solvent, N-methyl-2-pyrrolidone (NMP) and the like are preferred. As the positive electrode current collector, aluminum and alloys containing aluminum as a main component can be used because high corrosion resistance in an organic electrolytic solution is required.

In the secondary battery in accordance with the exemplary embodiment of the present invention, as the separator, porous films made of polyolefins, such as polypropylene and polyethylene, fluororesins, polyimides, polyamideimides, and the like can be used.

In the secondary battery in accordance with the exemplary embodiment of the present invention, as the electrolytic solution, nonaqueous electrolytic solutions in which a lithium salt is dissolved in one or two or more nonaqueous solvents can be used. Examples of the nonaqueous solvent include cyclic carbonates, such as propylene carbonate (PC), ethylene carbonate (EC), butylene carbonate (BC), and vinylene carbonate (VC); chain carbonates, such as dimethyl carbonate (DMC), diethyl carbonate (DEC), ethyl methyl carbonate (EMC), and dipropyl carbonate (DPC); aliphatic carboxylates, such as methyl formate, methyl acetate, and ethyl propionate; γ-lactones, such as γ-butyrolactone; chain ethers, such as 1,2-ethoxyethane (DEE) and ethoxymethoxyethane (EME); and cyclic ethers, such as tetrahydrofuran and 2-methyltetrahydrofuran.

In addition, as the nonaqueous solvent, aprotic organic solvents, such as dimethyl sulfoxide, 1,3-dioxolane, dioxolane derivatives, formamide, acetamide, dimethylformamide, acetonitrile, propionitrile, nitromethane, ethyl monoglyme, phosphate triester, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methylpyrrolidone can also be used.

Examples of the lithium salt dissolved in the nonaqueous solvent include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, lower aliphatic lithium carboxylate, chloroborane lithium, lithium tetraphenylborate, LiBr, LiI, LiSCN, LiCl, and imides. In addition, instead of nonaqueous electrolytic solutions, polymer electrolytes may be used.

In the secondary battery in accordance with the exemplary embodiment of the present invention, as the package body, can cases, package films, and the like can be used. As the can cases, stainless steel cans can be used. As the package films, laminate films including thermoplastic resins, such as polyethylene, polypropylene, or ionomer resins in which an ethylene-methacrylic acid copolymer or an ethylene-acrylic acid copolymer is intermolecularly bonded by a metal ion, as adhesive layers, can be used.

According to the exemplary embodiment of the present invention, the first charge and discharge efficiency is improved, and the energy density of the lithium ion secondary battery can be increased. In addition, the deterioration of the negative electrode and positive electrode of the lithium ion secondary battery can be suppressed, and an improvement in charge and discharge cycle characteristics can be obtained, particularly a sudden decrease in capacity during high temperature charge and discharge cycles can be suppressed.

EXAMPLES

A further description will be made below by giving Examples.

Example 1

As a negative electrode active material, a particle mixture including simple substance silicon and silicon dioxide (simple substance silicon/silicon dioxide=40/60 (weight ratio)) in which the average particle diameter $D_{50}$ measured by a laser diffraction-scattering method was adjusted to be 5 µm was prepared. 85 Parts by weight of this particle mixture was mixed with 50 parts by weight of a N-methyl-2-pyrrolidone (NMP) solution of polyamic acid as a binder solution (corresponding to 10 parts by weight of finally obtained polyimide) and 5 parts by weight of a natural graphite powder in which the average particle diameter $D_{50}$ was adjusted to be 5 µm, and NMP as a solvent was further added to dissolve and disperse the mixture to make a negative electrode material slurry. This slurry was applied in the shape of a 150×80 mm quadrangle to both surfaces of 10 µm thick copper foil, and the copper foil was dried in a drying furnace at 125° C. for 5 minutes, then compression-molded by a roll press, and dried again in the drying furnace at 300° C. for 10 minutes to form negative electrode active material layers on both surfaces of the negative electrode current collector.

At this time, the weight of the negative electrode active material layers was a weight corresponding to an active material capacity (the first charge capacity of the negative electrode when a potential of 0.02 V was reached with respect to metal lithium, the same applies to negative electrodes below) of 1.2 Ah.

One sheet in which negative electrode active material layers were formed on both surfaces of a negative electrode current collector was made in this manner, and punched into the shape of a 160×90 mm quadrangle.

Further, metal lithium with a weight corresponding to an active material capacity (the capacity of lithium with which the negative electrode was doped; the same applies to metal lithium below) of 0.10 Ah was vapor-deposited on the negative electrode active material layers formed on both surfaces of the negative electrode current collector to provide a negative electrode.

On the other hand, 92 parts by weight of positive electrode active material particles made of lithium nickelate was mixed with 4 parts by weight of polyvinylidene fluoride as a binder and 4 parts by weight of a carbon powder (amorphous carbon powder) as a conductive agent, and NMP as a solvent was further added to dissolve and disperse the mixture to make a positive electrode material slurry. This slurry was applied in the shape of a 150×80 mm quadrangle to one surface of 20 µm thick aluminum foil, and the aluminum foil was dried in a drying furnace at 125° C. for 5 minutes, and then compression-molded by a roll press to form a positive electrode active material layer on one surface of the positive electrode current collector.

At this time, the weight of the positive electrode active material layer was a weight corresponding to an active material capacity (the first charge capacity of the positive electrode when a potential of 4.3 V was reached with respect to metal lithium, the same applies to positive electrodes below) of 1.0 Ah.

Two sheets in which a positive electrode active material layer was formed on one surface of a positive electrode current collector were made in this manner, and punched into the shape of a 160×90 mm quadrangle to provide positive electrodes.

Then, separators in the shape of a 170×100 mm quadrangle made of a porous film of polypropylene were prepared. Then, a laminate in which the positive electrode, the separator, the negative electrode, the separator, and the positive electrode were superimposed in this order from below was obtained.

Then, a negative electrode terminal made of nickel for pulling out the electrode was fused to the negative electrode current collector by ultrasonic bonding.

Next, the two positive electrode current collectors were superimposed on the side opposite to the negative electrode terminal. Then, a positive electrode terminal made of aluminum for pulling out the electrode was fused to the superimposed portion by ultrasonic bonding. In this manner, the positive electrode terminal and the negative electrode terminal were disposed in opposed long side portions.

Package films were superimposed on both sides of the obtained laminate so that the adhesive layers were on the laminated cell sides, and then, three of four sides where the outer peripheral portions of the package films overlapped each other were heat sealed (sealed). Then, an electrolytic solution was injected, and the remaining one side was heat sealed under vacuum. Here, as the electrolytic solution, a solution obtained by dissolving $LiPF_6$ at a concentration of 1 mol/l in a solvent obtained by mixing ethylene carbonate (EC), diethyl carbonate (DEC), and ethyl methyl carbonate (EMC) at a volume ratio of 3:5:2 was used.

In the laminate type battery obtained thus, the tips of the negative electrode terminal and the positive electrode terminal protrude outside from the package film in directions opposite to each other. Seven of the laminate type batteries were made.

Two of the obtained laminate type batteries were fully charged to 4.2 V, which was the rating, and then discharged to 2.7 V.

For one of the cells, the package film was peeled, and the positive electrodes and the negative electrode were removed. The amounts of lithium in the positive electrodes and the negative electrode $M_{c2}$, and $M_{a2}$ were obtained by performing quantitative analysis by ICP-AES (inductively coupled plasma-atomic emission spectroscopy).

Next, the remaining one cell was further fully charged to 4.2 V, which was the rating, and then, the package film was peeled and the positive electrodes and the negative electrode were removed in the same manner as described above. The amounts of lithium in the positive electrodes and the negative electrode $M_{c1}$ and $M_{a1}$ were obtained by performing quantitative analysis by ICP-AES (inductively coupled plasma-atomic emission spectroscopy).

The amount of lithium inserted into the negative electrode, $M_a$, is obtained by the difference between the amount of lithium in the negative electrode in the charged state, $M_{a1}$, and the amount of lithium in the negative electrode in the discharged state, $M_{a2}$. In other words, the relation $M_a = M_{a1} - M_{a2}$ holds.

On the other hand, the amount of lithium released from the positive electrodes, $M_c$, is obtained by the difference between the amount of lithium in the positive electrodes in the discharged state, $M_{c2}$, and the amount of lithium in the positive electrodes in the charged state, $M_{c1}$. In other words, the relation $M_c = M_{c2} - M_{c1}$ holds.

In addition, the amount of lithium with which the negative electrode is doped, $M_{Li}$, corresponds to the amount of lithium in the negative electrode in the discharged state, $M_{a2}$. In other words, the relation $M_{Li} = M_{a2}$ holds.

$M_a$, $M_c$, and $M_{Li}$ obtained by the above analysis are shown in Table 1. The amount of lithium in the table is represented by the relative ratio of the number of atoms using $M_c$ in Example 1 as a reference (1).

(Evaluation of First Discharge Capacity, Cycle Characteristics, and Cell Thickness Increase Rate)

First, discharge capacities for the obtained five laminate type batteries when the batteries were fully charged to 4.2 V, which was the rating, and then discharged to 2.7 V under an atmosphere at a constant temperature of 20° C. were measured. They were taken as first discharge capacities (that is, charge and discharge capacities).

Then, under an atmosphere at a constant temperature of 45° C., for each laminate type battery, charge to 4.2 V and discharge to 2.7 V were repeated 100 times at 1 C rate, and discharge capacity after the 100 cycles was measured at 20° C. Note that the 1 C rate refers to the value of current at which nominal capacity (Ah) is charged and discharged in 1 hour. Then, the proportion of the discharge capacity after the 100 cycles to the first discharge capacity was calculated, and this was taken as cycle characteristics.

Further, the thickness of each laminate type battery was measured before the start of the cycle and after the 100 cycles, and the cell thickness increase rate was calculated.

The respective average values of the first discharge capacity, the cycle characteristics, and the cell thickness increase rate in the obtained five laminate type batteries are shown in Table 1.

Example 2

Example 2 was carried out as in Example 1 except that the weight of the formed negative electrode active material layers was a weight corresponding to an active material capacity of 1.2 Ah, and metal lithium with a weight corresponding to an active material capacity of 0.15 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of first discharge capacity, cycle characteristics, and cell thickness change rate in five laminate type batteries of the obtained laminate type batteries are shown in Table 1.

Example 3

Example 3 was carried out as in Example 1 except that the weight of the formed negative electrode active material layers was a weight corresponding to an active material capacity of 1.4 Ah, and metal lithium with a weight corresponding to an active material capacity of 0.10 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 4

Example 4 was carried out as in Example 1 except that the weight of the formed negative electrode active material layers was a weight corresponding to an active material capacity of 1.4 Ah, and metal lithium with a weight corresponding to an active material capacity of 0.35 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 5

Example 5 was carried out as in Example 1 except that the weight of the formed negative electrode active material layers was a weight corresponding to an active material capacity of 1.6 Ah, and metal lithium with a weight corresponding to an active material capacity of 0.10 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 6

Example 6 was carried out as in Example 1 except that the weight of the formed negative electrode active material layers was a weight corresponding to an active material capacity of 1.6 Ah, and metal lithium with a weight corresponding to an active material capacity of 0.50 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 7

Example 7 was carried out as in Example 1 except that the weight of the formed negative electrode active material layers was a weight corresponding to an active material capacity of 1.8 Ah, and metal lithium with a weight corresponding to an active material capacity of 0.15 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 8

Example 8 was carried out as in Example 1 except that the weight of the formed negative electrode active material layers was a weight corresponding to an active material capacity of 1.8 Ah, and metal lithium with a weight corresponding to an active material capacity of 0.70 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 9

Example 9 was carried out as in Example 1 except that the weight of the formed negative electrode active material layers was a weight corresponding to an active material capacity of 1.9 Ah, and metal lithium with a weight corresponding to an active material capacity of 0.20 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 10

Example 10 was carried out as in Example 1 except that the weight of the formed negative electrode active material layers was a weight corresponding to an active material capacity of 1.9 Ah, and metal lithium with a weight corresponding to an active material capacity of 0.80 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Example 11

Example 11 was carried out as in Example 1 except that the weight of the formed negative electrode active material layers was a weight corresponding to an active material capacity of 1.20 Ah, and metal lithium with a weight corresponding to an active material capacity of 0.18 Ah was vapor-deposited on the negative electrode active material layers. The obtained $M_a$, $M_c$, and $M_{Li}$, and evaluation results are shown in Table 1.

Example 12

Example 12 was carried out as in Example 1 except that the weight of the formed negative electrode active material layers was a weight corresponding to an active material capacity of 1.85 Ah, and metal lithium with a weight corresponding to an active material capacity of 0.17 Ah was vapor-deposited on the negative electrode active material layers. The obtained $M_a$, $M_c$, and $M_{Li}$, and evaluation results are shown in Table 1.

Example 13

Example 13 was carried out as in Example 1 except that the weight of the formed negative electrode active material layers was a weight corresponding to an active material capacity of 1.85 Ah, and metal lithium with a weight corresponding to an active material capacity of 0.70 Ah was vapor-deposited on the negative electrode active material layers. The obtained $M_a$, $M_c$, and $M_{Li}$, and evaluation results are shown in Table 1.

Comparative Example 1

Comparative Example 1 was carried out as in Example 1 except that the weight of the formed negative electrode active material layers was a weight corresponding to an active material capacity of 1.2 Ah, and metal lithium was not vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 2

Comparative Example 2 was carried out as in Example 1 except that the weight of the formed negative electrode active material layers was a weight corresponding to an active material capacity of 1.1 Ah, and metal lithium with a weight corresponding to an active material capacity of 0.05 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 3

Comparative Example 3 was carried out as in Example 1 except that the weight of the formed negative electrode active material layers was a weight corresponding to an active material capacity of 1.2 Ah, and metal lithium with a weight corresponding to an active material capacity of 0.25 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 4

Comparative Example 4 was carried out as in Example 1 except that the weight of the formed negative electrode active material layers was a weight corresponding to an active material capacity of 1.4 Ah, and metal lithium was not vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 5

Comparative Example 5 was carried out as in Example 1 except that the weight of the formed negative electrode active material layers was a weight corresponding to an active material capacity of 1.4 Ah, and metal lithium with a weight corresponding to an active material capacity of 0.45 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 6

Comparative Example 6 was carried out as in Example 1 except that the weight of the formed negative electrode active material layers was a weight corresponding to an active material capacity of 1.6 Ah, and metal lithium was not vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 7

Comparative Example 7 was carried out as in Example 1 except that the weight of the formed negative electrode active material layers was a weight corresponding to an active material capacity of 1.6 Ah, and metal lithium with a weight corresponding to an active material capacity of 0.65 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 8

Comparative Example 8 was carried out as in Example 1 except that the weight of the formed negative electrode active material layers was a weight corresponding to an active material capacity of 1.8 Ah, and metal lithium with a weight corresponding to an active material capacity of 0.05 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 9

Comparative Example 9 was carried out as in Example 1 except that the weight of the formed negative electrode active material layers was a weight corresponding to an active material capacity of 1.8 Ah, and metal lithium with a weight corresponding to an active material capacity of 0.85 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 10

Comparative Example 10 was carried out as in Example 1 except that the weight of the formed negative electrode active material layers was a weight corresponding to an active material capacity of 1.9 Ah, and metal lithium with a weight corresponding to an active material capacity of 0.10 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 11

Comparative Example 11 was carried out as in Example 1 except that the weight of the formed negative electrode active material layers was a weight corresponding to an active material capacity of 1.9 Ah, and metal lithium with a weight corresponding to an active material capacity of 0.95 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

Comparative Example 12

Comparative Example 12 was carried out as in Example 1 except that the weight of the formed negative electrode active material layers was a weight corresponding to an active material capacity of 2.0 Ah, and metal lithium with a weight corresponding to an active material capacity of 0.50 Ah was vapor-deposited on the negative electrode active material layers.

For two of the obtained laminate type batteries, the amount of lithium inserted into the negative electrode, $M_a$, the amount of lithium released from the positive electrodes, $M_c$, and the amount of lithium with which the negative electrode was doped, $M_{Li}$, are shown in Table 1.

In addition, the respective average values of the evaluation results of first discharge capacity, cycle characteristics, and cell thickness change rate in five laminate type batteries of the obtained laminate type batteries are shown in Table 1.

TABLE 1

| | Active material capacity (Ah) | | | Conditions | | Amount of lithium (Ratio of the number of atoms using $M_c$ in Example 1 as reference) | | | Conditions | | Evaluation results | | |
|---|---|---|---|---|---|---|---|---|---|---|---|---|---|
| | $C_a$ | $C_{Li}$ | $C_c$ | $C_a/C_c$ | $(C_c + C_{Li})$ | $M_a$ | $M_{Li}$ | $M_c$ | $M_a/M_c$ | $(M_c + M_{Li})$ | First discharge capacity (mAh) | Cycle characteristics (%) | Cell thickness increase rate (%) |
| Example 1 | 1.20 | 0.10 | 1.00 | 1.20 | 1.09 | 1.24 | 0.10 | 1.00 | 1.24 | 1.13 | 749 | 85 | 8 |
| Example 2 | 1.20 | 0.15 | 1.00 | 1.20 | 1.04 | 1.21 | 0.15 | 1.01 | 1.20 | 1.04 | 764 | 82 | 9 |
| Example 3 | 1.40 | 0.10 | 1.00 | 1.40 | 1.27 | 1.40 | 0.10 | 1.00 | 1.40 | 1.27 | 747 | 84 | 8 |
| Example 4 | 1.40 | 0.35 | 1.00 | 1.40 | 1.04 | 1.39 | 0.35 | 0.98 | 1.42 | 1.05 | 796 | 81 | 9 |
| Example 5 | 1.60 | 0.10 | 1.00 | 1.60 | 1.45 | 1.62 | 0.10 | 1.01 | 1.60 | 1.46 | 756 | 83 | 9 |
| Example 6 | 1.60 | 0.50 | 1.00 | 1.60 | 1.07 | 1.64 | 0.50 | 0.99 | 1.66 | 1.10 | 828 | 82 | 10 |
| Example 7 | 1.80 | 0.15 | 1.00 | 1.80 | 1.56 | 1.84 | 0.15 | 1.02 | 1.80 | 1.57 | 775 | 80 | 9 |
| Example 8 | 1.80 | 0.70 | 1.00 | 1.80 | 1.06 | 1.81 | 0.70 | 1.02 | 1.77 | 1.05 | 842 | 81 | 10 |
| Example 9 | 1.90 | 0.20 | 1.00 | 1.90 | 1.58 | 1.87 | 0.20 | 0.99 | 1.89 | 1.57 | 783 | 81 | 10 |
| Example 10 | 1.90 | 0.80 | 1.00 | 1.90 | 1.06 | 1.92 | 0.80 | 1.00 | 1.90 | 1.06 | 850 | 80 | 10 |
| Example 11 | 1.20 | 0.18 | 1.00 | 1.20 | 1.02 | 1.19 | 0.18 | 1.00 | 1.19 | 1.01 | 768 | 79 | 9 |
| Example 12 | 1.85 | 0.17 | 1.00 | 1.85 | 1.58 | 1.84 | 0.17 | 1.00 | 1.84 | 1.57 | 782 | 80 | 9 |
| Example 13 | 1.85 | 0.70 | 1.00 | 1.85 | 1.09 | 1.86 | 0.70 | 1.01 | 1.84 | 1.09 | 849 | 81 | 10 |
| Comparative Example 1 | 1.20 | 0.00 | 1.00 | 1.20 | 1.20 | 1.22 | 0.00 | 1.00 | 1.22 | 1.22 | 676 | 80 | 10 |
| Comparative Example 2 | 1.10 | 0.05 | 1.00 | 1.10 | 1.05 | 1.08 | 0.05 | 1.02 | 1.06 | 1.01 | 712 | 77 | 8 |
| Comparative Example 3 | 1.20 | 0.25 | 1.00 | 1.20 | 0.96 | 1.20 | 0.25 | 0.97 | 1.24 | 0.98 | 758 | 67 | 10 |
| Comparative Example 4 | 1.40 | 0.00 | 1.00 | 1.40 | 1.40 | 1.39 | 0.00 | 0.98 | 1.42 | 1.42 | 683 | 71 | 8 |
| Comparative Example 5 | 1.40 | 0.45 | 1.00 | 1.40 | 0.97 | 1.42 | 0.45 | 0.99 | 1.43 | 0.99 | 789 | 62 | 9 |
| Comparative Example 6 | 1.60 | 0.00 | 1.00 | 1.60 | 1.60 | 1.56 | 0.00 | 1.02 | 1.53 | 1.53 | 695 | 73 | 9 |
| Comparative Example 7 | 1.60 | 0.65 | 1.00 | 1.60 | 0.97 | 1.60 | 0.65 | 0.99 | 1.62 | 0.98 | 819 | 56 | 10 |
| Comparative Example 8 | 1.80 | 0.05 | 1.00 | 1.80 | 1.71 | 1.86 | 0.05 | 1.03 | 1.81 | 1.72 | 727 | 69 | 9 |
| Comparative Example 9 | 1.80 | 0.85 | 1.00 | 1.80 | 0.97 | 1.79 | 0.85 | 1.00 | 1.79 | 0.97 | 837 | 49 | 9 |
| Comparative Example 10 | 1.90 | 0.10 | 1.00 | 1.80 | 1.73 | 1.88 | 0.10 | 1.01 | 1.86 | 1.69 | 736 | 67 | 10 |

TABLE 1-continued

| | Active material capacity (Ah) | | | Conditions | | Amount of lithium (Ratio of the number of atoms using $M_c$ in Example 1 as reference) | | | Conditions | | Evaluation results | | |
|---|---|---|---|---|---|---|---|---|---|---|---|---|---|
| | | | | $C_a/C_c$ | $(C_c + C_{Li})$ | | | | $M_a/M_c$ | $(M_c + M_{Li})$ | First discharge capacity (mAh) | Cycle character-istics (%) | Cell thickness increase rate (%) |
| | $C_a$ | $C_{Li}$ | $C_c$ | | | $M_a$ | $M_{Li}$ | $M_c$ | | | | | |
| Comparative Example 11 | 1.90 | 0.95 | 1.00 | 1.90 | 0.97 | 1.91 | 1.05 | 0.99 | 1.93 | 0.94 | 832 | 42 | 10 |
| Comparative Example 12 | 2.00 | 0.50 | 1.00 | 2.00 | 1.33 | 2.03 | 0.50 | 1.02 | 1.99 | 1.34 | 846 | 73 | 13 |

In the lithium ion secondary batteries in accordance with this exemplary embodiment, an increase of at least 10% or more in capacity, compared with the first discharge capacity of the laminate type battery of Comparative Example 1, is possible. In other words, regarding the first discharge capacity, a superior effect of not less than 744 mAh, which is 10% larger than the first discharge capacity of Comparative Example 1, can be obtained.

Regarding the cycle characteristics for 100 cycles at 45° C., a superior effect of not less than 80%, which is the cycle characteristics of Comparative Example 1, can be obtained.

Further, also regarding the cell thickness change rate, a superior effect of not more than about the cell thickness increase rate of Comparative Example 1, that is, not more than 10%, can be obtained.

Since the laminate type batteries obtained in Examples 1 to 10 satisfy the conditions of formula (1) and formula (2) or further formula (3) and formula (4), such superior effects can be obtained.

According to the evaluation results of Examples 1 to 10 and Comparative Examples 1 to 12 shown in Table 1, the following is found. By setting the ratio $C_a/C_c$ of the first charge capacity of the negative electrode, $C_a$, to the first charge capacity of the positive electrode, $C_c$, or the ratio $M_a/M_c$ of the amount of lithium inserted into the negative electrode, $M_a$, to the amount of lithium released from the positive electrode, $M_c$, to 1.2 or more in a lithium ion secondary battery, particularly the first discharge capacity can be improved. This improvement effect tends to increase as $C_a/C_c$ or $M_a/M_c$ increases. In addition, by setting $C_d/(C_c+C_{Li})$ or $M_a/(M_c+M_{Li})$ larger than 1.0 and smaller than 1.6, particularly the cycle characteristics after 100 cycles at 45° C. are excellent, and simultaneously, an improvement in first discharge capacity is also seen. Note that since the cell thickness increase rates are all almost equivalent, an increase in first discharge capacity directly leads to an increase in battery energy density.

On the other hand, when $C_a/C_c$ and $M_a/M_c$ are smaller than 1.2 as in Comparative Example 2, the increase in first discharge capacity due to lithium doping is small. This is because the capacity of lithium with which the negative electrode is doped, $C_{Li}$, cannot be increased. In addition, when $C_a/C_c$ and $M_a/M_c$ are larger than 1.9 as in Comparative Example 12, the cycle characteristics tend to decrease. This is probably to be that the amount of lithium with which the negative electrode is doped is excessive, causing the deterioration of the negative electrode.

Further, when $C_d/(C_c+C_{Li})$ and $M_a/(M_c+M_{Li})$ are 1.0 or less as in Comparative Examples 3, 5, 7, 9, and 11, the cycle characteristics tend to decrease. This is probably because excess lithium is likely to be deposited on the negative electrode.

In addition, also when $C_d/(C_c+C_{Li})$ and $M_a/(M_c+M_{Li})$ are 1.6 or more as in Comparative Examples 8 and 10, the cycle characteristics after 100 cycles at 45° C. tend to decrease. This is probably to be because the negative electrode deterioration during discharge increases.

In Comparative Examples 1, 4, 6, 8, and 10, the capacity of lithium with which the negative electrode is doped, $C_{Li}$, is 0 or small, and therefore, the increase in first discharge capacity due to lithium doping is also small. In Comparative Example 12, $C_d/C_c$ and $M_a/M_c$ are larger than 1.9, and in this case, the volume change (change in cell thickness) due to charge and discharge is large, and a decrease in cycle characteristics was seen.

Figure 3:
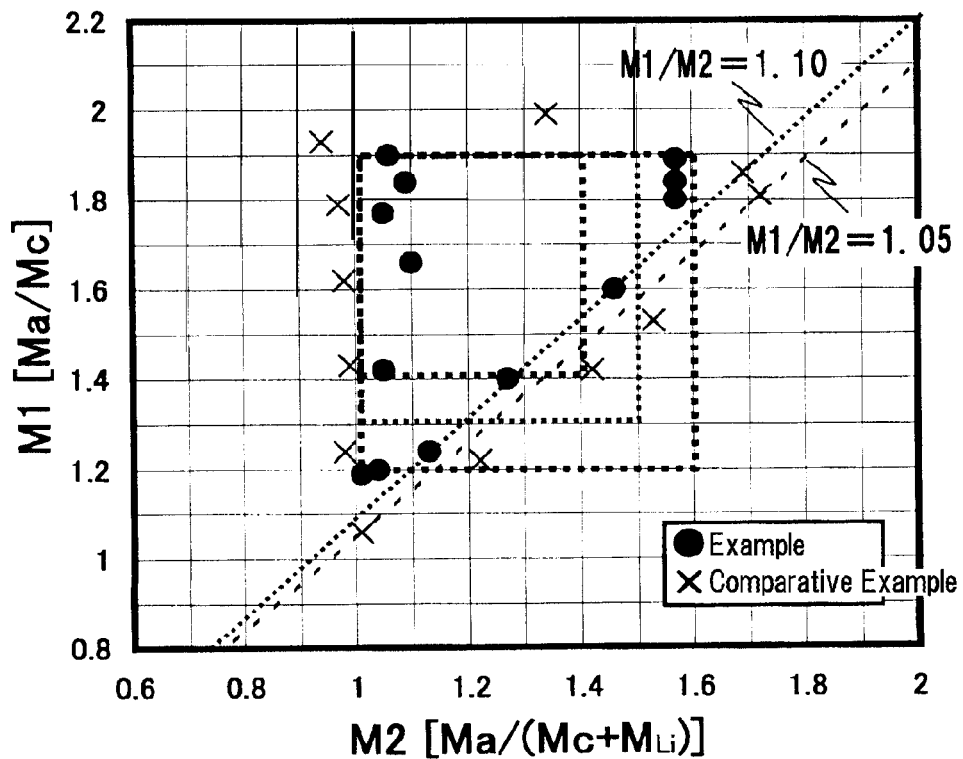
FIG. 3 is a diagram showing the relationship between the amounts of lithium in the lithium secondary batteries of Examples in accordance with the present invention and Comparative Examples.
Figure 4:
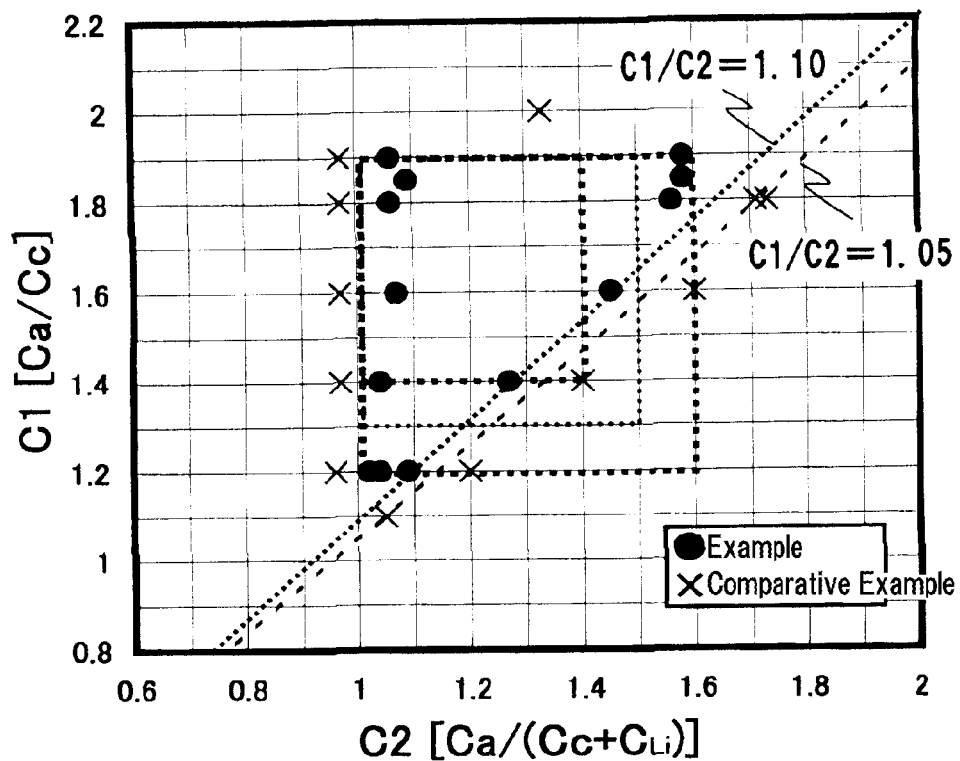
FIG. 4 is a diagram showing the relationship between capacities in the lithium secondary batteries of the Examples in accordance with the present invention and the Comparative Examples.

FIG. 3 shows the relationship between the amounts of lithium in the lithium secondary batteries of the Examples and the Comparative Examples, and FIG. 4 shows the relationship between the capacities in the lithium secondary batteries of the Examples and the Comparative Examples. In FIG. 3, the region shown by the outer dotted quadrangle shows the range that satisfies formula (1) and formula (2), and the regions shown by the inner dotted quadrangles show preferred ranges. In these ranges, the regions above the dotted oblique straight line (M1/M2=1.05 or M1/M2=1.10) are more preferred. In FIG. 4, the region shown by the outer dotted quadrangle shows the range that satisfies formula (3) and formula (4), and the regions shown by the inner dotted quadrangles show preferred ranges. In these ranges, the regions above the dotted oblique straight line (C1/C2=1.05 or C1/C2=1.10) are more preferred. Note that the plots of the Comparative Examples (x) are in the regions shown by the outer dotted quadrangles, but in these Comparative Examples, the negative electrode is not doped with lithium.

As shown above, according to this exemplary embodiment, the initial characteristics of the battery can be increased without impairing cycle characteristics, and a secondary battery with high energy density can be obtained.

While the present invention has been described with reference to the exemplary embodiments, the present invention is not limited to the above exemplary embodiments. Various changes that can be understood by those skilled in the art may be made to the constitution and details of the present invention within the scope thereof.

This application claims the right of priority based on Japanese Patent Application No. 2010-170760 filed Jul. 29, 2010, and Japanese Patent Application No. 2011-47784 filed Mar. 4, 2011, the entire content of which is incorporated herein by reference.

INDUSTRIAL APPLICABILITY

The lithium ion secondary battery in accordance with this exemplary embodiment can be used for products to which lithium ion secondary batteries can be applied, such as applications for energy regeneration in electric cars, engine drive, applications for storage by combination with solar batteries, emergency power supplies for industrial equipment, and the drive of consumer equipment.

REFERENCE SIGNS LIST 1 negative electrode active material layer
2 negative electrode current collector
3 positive electrode active material layer
4 positive electrode current collector
5 separator
6 negative electrode terminal
7 positive electrode terminal
8 package body

The invention claimed is:

1. A lithium ion secondary battery comprising a positive electrode, a separator, a negative electrode, and a package body,
wherein the negative electrode comprises simple substance silicon as a negative electrode active material, and a negative electrode binder, and is doped with lithium, and the following formulas (1) and (2) are satisfied:

$$1.2 \le M_a/M_c \le 1.9 \quad (1)$$

$$1.0 < M_a/(M_c+M_{Li}) < 1.6 \quad (2)$$

wherein an amount of lithium inserted into the negative electrode until the negative electrode reaches a potential of 0.02 V with respect to metal lithium is $M_a$ (a number of atoms), an amount of lithium released from the positive electrode until the positive electrode reaches a potential of 4.3 V with respect to metal lithium is $M_c$ (a number of atoms), and an amount of lithium with which the negative electrode is doped is $M_{Li}$ (a number of atoms), and
wherein M1/M2 is 1.05 or more, wherein $M_a/M_c$ is represented as M1, and $M_a/(M_c+M_{Li})$ is represented as M2.

2. A lithium ion secondary battery comprising a positive electrode, a separator, a negative electrode, and a package body,
wherein the negative electrode comprises simple substance silicon as a negative electrode active material, and a negative electrode binder, and is doped with lithium, and the following formulas (3) and (4) are satisfied:

$$1.2 \le C_a/C_c \le 1.9 \quad (3)$$

$$1.0 < C_a/(C_c+C_{Li}) < 1.6 \quad (4)$$

wherein a first charge capacity of the negative electrode when a potential of 0.02 V is reached with respect to metal lithium is $C_a$ (Ah), a first charge capacity of the positive electrode when a potential of 4.3 V is reached with respect to metal lithium is $C_c$ (Ah), and a capacity of lithium with which the negative electrode is doped is $C_{Li}$ (Ah), and
wherein C1/C2 is 1.05 or more, wherein $C_a/C_c$ is represented as C1, and $C_a/(C_c+C_{Li})$ is represented as C2.

3. The lithium ion secondary battery according to claim 1, wherein the following formulas (5), (6), and (7) are satisfied:

$$M_a = M_{a1} - M_{a2} \quad (5)$$

$$M_c = M_{c2} - M_{c1} \quad (6)$$

$$M_{Li} = M_{a2} \quad (7)$$

wherein an amount of lithium in the negative electrode and an amount of lithium in the positive electrode in a charged state are $M_{a1}$ and $M_{c1}$, respectively, and
an amount of lithium in the negative electrode and an amount of lithium in the positive electrode in a discharged state are $M_{a2}$ and $M_{c2}$, respectively.

4. The lithium ion secondary battery according to claim 1, wherein the negative electrode active material comprises simple substance silicon and a silicon compound.

5. The lithium ion secondary battery according to claim 1, wherein the negative electrode active material comprises simple substance silicon, a silicon compound, and carbon.

6. The lithium ion secondary battery according to claim 4, wherein the negative electrode active material comprises silicon oxide as the silicon compound.

7. The lithium ion secondary battery according to claim 1, wherein the negative electrode binder comprises a thermosetting material.

8. The lithium ion secondary battery according to claim 1, wherein the negative electrode comprises a polyimide or a polyamideimide as the negative electrode binder.

9. The lithium ion secondary battery according to claim 1, wherein the negative electrode comprises a negative electrode active material layer comprising the negative electrode active material,
the positive electrode comprises a positive electrode active material layer comprising a positive electrode active material,
the positive electrode active material layer and the negative electrode active material layer are disposed opposed to each other via the separator, and
an area of a surface of the negative electrode active material layer on a side opposed to the positive electrode active material layer is smaller than an area of a surface of the positive electrode active material layer on a side opposed to the negative electrode active material layer.

10. A method for manufacturing a lithium ion secondary battery according to claim 1, wherein a weight of an active material of the positive electrode, a weight of the active material of the negative electrode, and a weight of lithium with which the negative electrode is doped are set so as to satisfy formulas (1) and (2).

11. A method for manufacturing a lithium ion secondary battery according to claim 2, wherein a weight of an active material of the positive electrode, a weight of the active material of the negative electrode, and a weight of lithium with which the negative electrode is doped are set so as to satisfy formulas (3) and (4).

12. The method for manufacturing a lithium ion secondary battery according to claim 10, wherein the negative electrode is doped with lithium by vapor-depositing lithium on a layer comprising the negative electrode active material.

13. The method for manufacturing a lithium ion secondary battery according to claim 11, wherein the negative electrode is doped with lithium by vapor-depositing lithium on a layer comprising the negative electrode active material.

14. The lithium ion secondary battery according to claim 1, wherein the weight proportion of the simple substance silicon in the negative electrode active material is 5% or more, and less than 50%.

15. The lithium ion secondary battery according to claim 14, wherein the negative electrode active material further comprises a silicon compound, and the ratio W2/W1 of the weight of the silicon compound W2 to the weight of simple substance silicon W1 is 0.8 or more, and less than 10.

16. The lithium ion secondary battery according to claim 15, wherein the silicon compound comprises a silicon oxide.

17. The lithium ion secondary battery according to claim 2, wherein the weight proportion of the simple substance silicon in the negative electrode active material is 5% or more, and less than 50%.

18. The lithium ion secondary battery according to claim 17, wherein the negative electrode active material further comprises a silicon compound, and the ratio W2/VV1 of the weight of the silicon compound W2 to the weight of simple substance silicon W1 is 0.8 or more, and less than 10.

19. The lithium ion secondary battery according to claim 18, wherein the silicon compound comprises a silicon oxide.

\* \* \* \* \*

UNITED STATES PATENT AND TRADEMARK OFFICE
CERTIFICATE OF CORRECTION

| | |
|---|---|
| PATENT NO. | : 8,956,762 B2 |
| APPLICATION NO. | : 13/805565 |
| DATED | : February 17, 2015 |
| INVENTOR(S) | : Ryuichi Kasahara et al. |

It is certified that error appears in the above-identified patent and that said Letters Patent is hereby corrected as shown below:

In the claims

Column 25, Line 7: In Claim 18, delete "W2/VV1" and insert -- W2/W1 --

Signed and Sealed this
Twenty-second Day of December, 2015

Michelle K. Lee
*Director of the United States Patent and Trademark Office*